United States Patent
Grigsby, Jr.

[11] Patent Number: 5,335,443
[45] Date of Patent: Aug. 9, 1994

[54] WEIGHT FOR FISH LURE

[76] Inventor: Shaw Grigsby, Jr., 3508 NW. 27th St., Gainesville, Fla. 32605

[21] Appl. No.: 41,855

[22] Filed: Apr. 2, 1993

[51] Int. Cl.$^5$ ............................................. A01K 83/06
[52] U.S. Cl. .................... 43/44.81; 43/44.89; 43/43.14
[58] Field of Search ............... 43/44.81, 44.8, 44.89, 43/43.1, 43.14, 43.13, 42.37, 42.38, 42.39

[56] References Cited

U.S. PATENT DOCUMENTS

| | | | |
|---|---|---|---|
| 501,346 | 7/1893 | Homan | 43/43.14 |
| 1,050,748 | 1/1913 | Paulsson | 43/43.14 |
| 2,086,457 | 7/1937 | Zielesch | 43/44.97 |
| 3,180,052 | 4/1965 | Malesko | 43/43.14 |
| 3,344,549 | 10/1967 | Peters et al. | 43/42.37 |
| 3,461,597 | 8/1969 | Hobson | 43/43.14 |
| 3,611,614 | 10/1971 | Ward | 43/42.37 |
| 3,803,747 | 4/1974 | Cartwright | 43/44.81 |
| 4,791,749 | 12/1988 | Stazo | 43/42.39 |

*Primary Examiner*—P. Austin Bradley
*Assistant Examiner*—Churk Y. Mah
*Attorney, Agent, or Firm*—Arthur G. Yeager

[57] ABSTRACT

A fishing weight especially designed for use with a hollow plastic lure having a loop at one end attachably threaded on a hook, from its point to its operative position stopped by an eye of the hook, the weight being adapted to fit within the hollow of the lure.

18 Claims, 1 Drawing Sheet

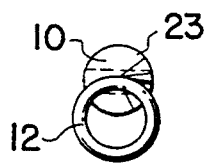
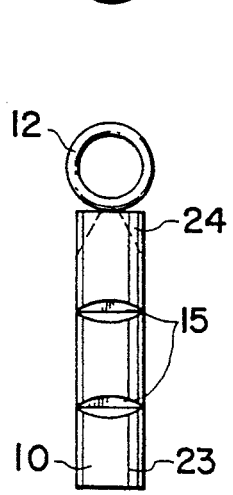
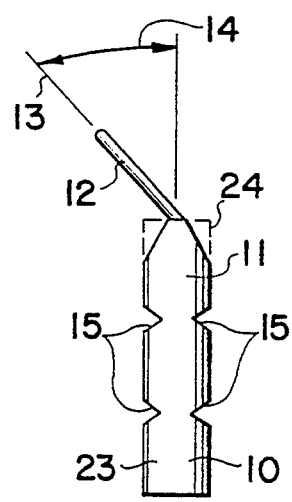
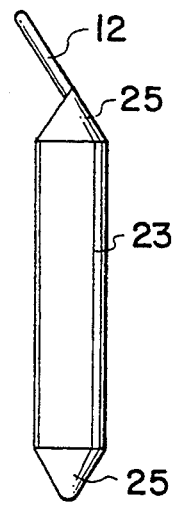
FIG 3
FIG 1
FIG 2
FIG 4
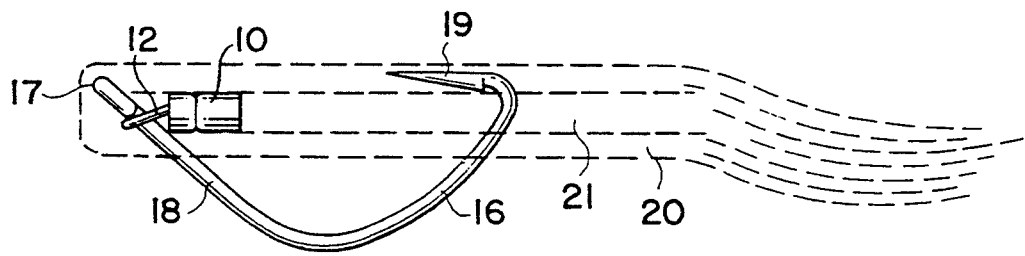
FIG 5
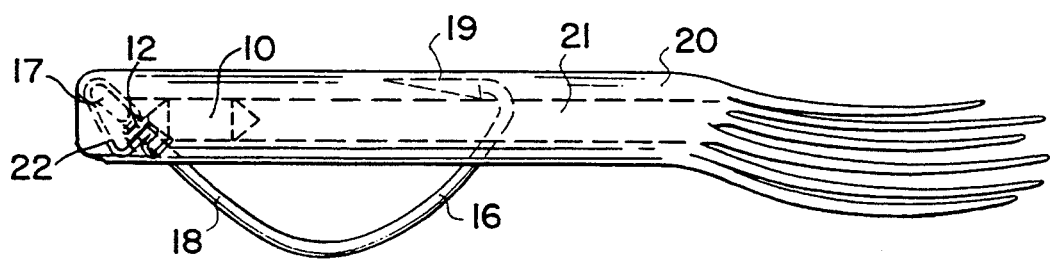
FIG 6

WEIGHT FOR FISH LURE

RELATED DOCUMENT

This invention is described in Disclosure Document No. 288148 filed Aug. 2, 1991.

BACKGROUND OF THE INVENTION

This invention relates to a new improved weight for fishing lures, and to a combination of the weight with a hook and a plastic lure.

Generally, weights or sinkers for fishing purposes have been molded pieces of lead that are attached to a fishing line above the hook or lure so as not to interfere with the fish attracted to the lure and yet be close enough to the hook or lure that it brings the hook or lure to the desired depth in the water. It is generally believed by fishermen that the weight or sinker should be as invisible as possible so as not to scare the fish away and at the same time be effective in keeping the hook or lure at a selected depth. Both of these requirements have not been found in weights used in the prior art.

A particularly desirable hook and lure is that described in U.S. Pat. No. 4,905,402 issued Mar. 6, 1990 to Thomas C. Clark. This combination can easily be enhanced by the weight of this invention.

It is an object of this invention to provide a novel improved fishing weight. It is another object to provide a weight that can be concealed inside a plastic lure. Still other objects will become apparent from the more detailed description which follows.

BRIEF SUMMARY OF THE INVENTION

This invention relates to a fishing weight including a cylindrical body of heavy metal with a longitudinal axis through that body and a planar loop of wire extending outwardly from one end of the body and bent at an angle of about 45 degrees from the axis.

In a preferred embodiment, the weight is slightly elongated and made with a plurality of pairs of pinch marks at right angles to the axis and adapted to be broken off to leave a selected weight attached to the hook. In another embodiment, the weight is attached to the shank of a hook-and-plastic lure combination wherein the weight is concealed inside the lure.

In one aspect the 45 degree angled loop of the weight loosely hangs from the shank of a hook adjacent the eye so that the weight can be disposed substantially in line between the eye and the barbed point and drop downwardly against the shank when a fish is biting down on lure and hook so as not to interfere with the hooking ability in catching the fish.

In another aspect the weight may be readily changed without untying the line from the hook by merely threadedly disengaging the loop from its position adjacent the eye to along the shank and over the barbed point and reversing the process with a longer and heavier weight. Of course, to decrease the weight it is only necessary to snip off a free end position opposite to the loop.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a front elevational view of the fishing weight of this invention;

FIG. 2 is a side elevational view of the fishing weight of this invention;

FIG. 3 is a top plan view of the fishing weight of this invention;

FIG. 4 is an alternative embodiment of the weight of FIG. 2;

FIG. 5 is a side elevational view of a fish hook employing the fishing weight of this invention; and FIG. 6 is a side elevational view of a combination hook, plastic lure, lure-attaching spring, and the fishing weight of this invention.

DETAILED DESCRIPTION OF THE INVENTION

The features of this invention are best understood by reference to the attached drawings.

In FIGS. 1-4 there is shown the fishing weight or sinker 10 of this invention. The weight 10 has an elongated body 23 of a heavy metal, such as lead, and a loop or eye 12 of wire by means of which the weight 10 can be tied to a hook, line, or lure. In these drawings the body 23 is shown to be cylindrical although it is equally operable if the cross section is square, triangular, or other simple geometrical shape. Body 23 has a longitudinal axis 11 and preferably is creased or marked by a plurality of pairs of opposed pinch marks 15 which are deep enough to permit body 23 to be easily broken manually by attempting to bend body 23 about any pinch mark 15. The purpose of the pinch marks is, of course, to permit the manufacture and sale of a weight 10 which can be made lighter by breaking off a segment of body 23. This capability permits the fisherman to buy one type of weight than can be transformed into other lighter weights when needed.

Weight 10 has a wire loop or eye 12 at one end of body 23 to permit the weight 10 to be attached to a hook, line, or lure by a piece of line, a length of wire, or by a snap-hook attachment to a swivel or other fishing equipment. In order for the weight 10 to be capable of lying at an acute angle to a hook, loop or eye 12 is positioned in a plane 13 which is at an angle 14 of 30 degrees to 60 degrees, preferably 45 degrees, to axis 11 of weight 10. As may be seen in FIGS. 5 and 6 this angle permits weight 10 to lie inside the hollow of tubular plastic lures. Loop or eye 12 normally is embedded in weight 10 when it is made by casting lead in a mold. Pinch marks 15 may be made by having appropriate ridges in the mold or they may be incorporated later by machining or by pressing an edge into the pre-cast lead. The end of the weight 10 may or may not be tapered as of 24. FIGS. 1, 2 and 4 show optional designs wherein the body 23 does not contain pinch marks, but is tapered at the end where the wire loop 12 is located or is tapered at both ends as in FIG. 4.

A particularly preferred embodiment in the use of the weight 10 of this invention is shown in FIGS. 5 and 6. In FIG. 5, weight 10 is attached to hook 16 around its shank 18, by merely threading the point 19 through loop or eye 12 of weight 10. A plastic tubular lure 20 may be employed by sliding weight 10 into the hollow 21 at the head end of lure 20, prior to or after attaching weight 10 to hook 16. The point 19 may be at the upper surface of the lure 20 just below, or barely sticking upwardly through the upper surface of the lure 20. Preferably lure 20 covers all of hook 16 including as much of eye 17 as possible.

FIG. 6 shows the preferred use with a lure attaching spring hook of U.S. Pat. No. 4,905,402 to Clark, mentioned above. In this combination a rounded hook 16 has its point 19 embedded in a hollow plastic lure 20 and the head of lure 20 is fastened to hook 16 by a spring wire hook 22 that pierces the plastic lure and snaps onto the shank of hook 16 near its eye 17. Weight 10 is attached to hook 16 through the loop or eye 12 of weight 10 in the hollow 21 of lure 20. In this way the weight 10 performs its purpose of sinking the lure to its selected depth without dangling from the hook or being attached to the line above the hook in any fashion that might scare the fish away from the lure.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A fishing apparatus comprising a weight having a cylindrical body of heavy metal, said body having opposite ends with a longitudinal axis through said body between said ends, and a planar loop of wire extending outwardly from one said end of said body and bent at an angle from said longitudinal axis, a fishing lure, a short C-shaped hook having an elongated shank portion and having opposite end portions with an eye at one said end portion and a barbed point at said other end portion, a wire spring clip adjacent said eye for attachment of said lure thereto, said lure having an elongated hollow therein with said shank of said hook threaded therethrough to dispose said point below and adjacent an outer surface of said lure, said weight body lying within said hollow and adjacent said eye with said shank of said hook being threaded through said weight loop.

2. The apparatus of claim 1 wherein said angle is about 45 degrees.

3. The fishing apparatus of claim 1 wherein said body is elongated and contains a plurality of parallel spaced pinch marks adapted to provide locations for cutting said body to selected shorter lengths for adjusting the mass of said weight to be used.

4. The apparatus of claim 1 wherein said body is tapered at said one end from which said loop of wire extends.

5. The apparatus of claim 1 wherein said body is tapered at both said ends.

6. A fishing apparatus comprising a weight having a cylindrical body of heavy metal, said body having opposite ends with a longitudinal axis through said body between said ends, and a planar loop of wire extending outwardly from one said end of said body and bent at an angle from said longitudinal axis, a fishing hook having an eye, a shank, and a barbed point, said loop of said weight encircling said shank and being disposed adjacent said eye of said hook, said weight being adapted to be embedded in a lure with said eye, said weight and said hook being generally in alignment in a vertical plane.

7. The apparatus of claim 6 wherein said body is elongated and contains a plurality of parallel spaced pinch marks adapted to provide locations for cutting said body to selected shorter lengths for adjusting the mass of said weight to be used.

8. The apparatus of claim 6 wherein said angle is about 45 degrees.

9. The apparatus of claim 6 wherein said body is tapered at said one end from which said loop of wire extends.

10. The apparatus of claim 6 wherein said body is tapered at both said ends.

11. A fishing apparatus comprising a weight having a cylindrical body of heavy metal, said body having opposite ends with a longitudinal axis through said body between said ends, and a planar loop of wire extending outwardly from one said end of said body and bent at an angle from said longitudinal axis, a fishing lure and a hook, said lure having a tubular plastic lure body, said hook having a point which is of a size to pass through said weight loop and an eye which is larger than said weight loop, said hook having a shank connecting said eye to said point, said loop of said weight encircling said shank adjacent said eye and said weight body of said weight being positioned within said tubular plastic lure.

12. The apparatus of claim 11 wherein said angle is about 45 degrees.

13. The fishing apparatus of claim 11 wherein said body is elongated and contains a plurality of parallel spaced pinch marks adapted to provide locations for cutting said body to selected shorter lengths for adjusting the mass of said weight to be used.

14. The apparatus of claim 11 wherein said body is tapered at said one end from which said loop of wire extends.

15. The apparatus of claim 11 wherein said body is tapered at both said ends.

16. The apparatus of claim 11 wherein said loop of said weight is within said plastic lure.

17. The apparatus of claim 11 wherein said point of said hook is embedded in said lure with said point being directed toward said eye and being generally in alignment in a horizontal plane with said eye.

18. The apparatus of claim 11 further comprising a spring clip connected to said hook for engaging said lure adjacent said eye to inhibit inadvertent dislodgement of said lure from its position generally overlying said eye of said hook.

* * * * *